C. A. HUSSEY.
RELIEF VALVE FOR PNEUMATIC TIRES.
APPLICATION FILED SEPT. 18, 1918.
1,325,019.
Patented Dec. 16, 1919.
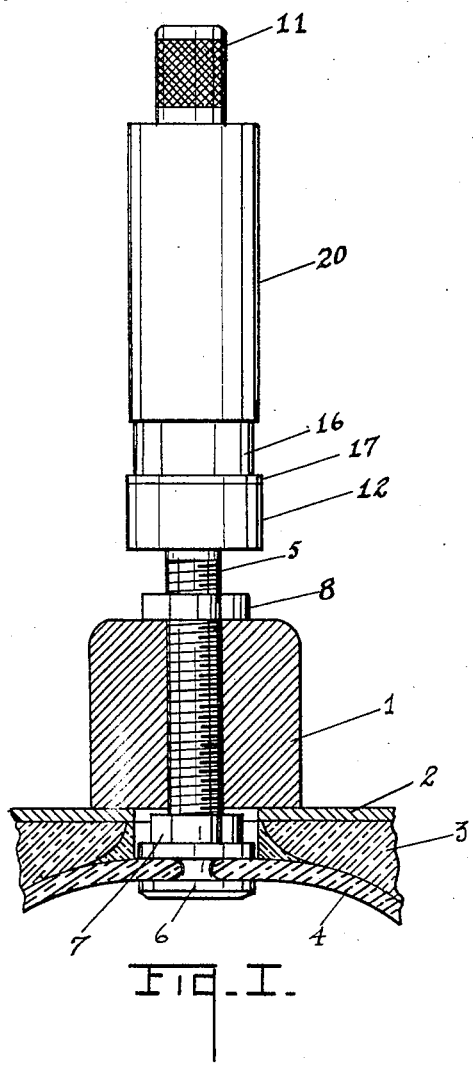
Fig. I.
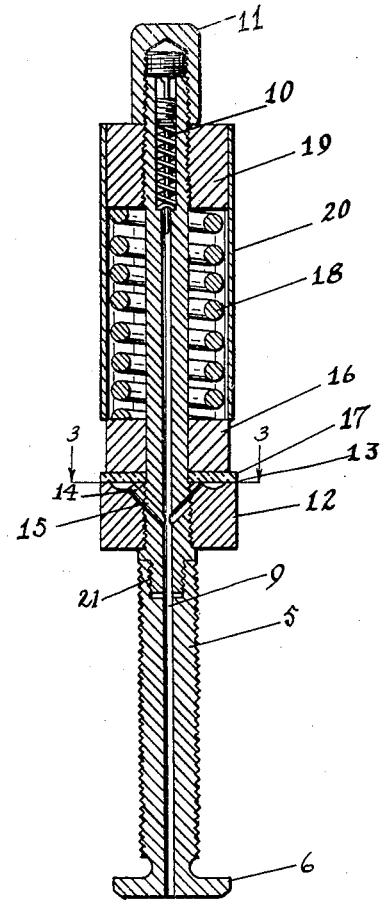
Fig. II.
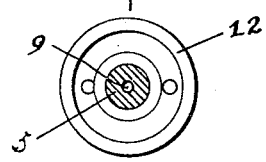
Fig. III.
Inventor
Charles A Hussey
By Chappell & Earl
Attorneys
Witnesses
Fred Ullrich
Leny Gilman

UNITED STATES PATENT OFFICE.

CHARLES A. HUSSEY, OF BATTLE CREEK, MICHIGAN.

RELIEF-VALVE FOR PNEUMATIC TIRES.

1,325,019.     Specification of Letters Patent.     Patented Dec. 16, 1919.

Application filed September 18, 1918. Serial No. 254,537.

*To all whom it may concern:*

Be it known that I, CHARLES A. HUSSEY, a citizen of the United States, residing at Battle Creek, Michigan, have invented certain new and useful Improvements in Relief-Valves for Pneumatic Tires, of which the following is a specification.

This invention relates to improvements in relief valves for pneumatic tires.

The main objects of this invention are:

First, to provide an improved relief valve for pneumatic tires permitting the inflation of the tires in the usual way and relieving the pressure when it exceeds a predetermined point.

Second, to provide an improved relief valve having these advantages which may be substituted for inflation valves in common use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is an elevation of a structure embodying the features of my invention, a tire and rim being shown in transverse section in conventional form.

Fig. II is a central longitudinal section through my improved pressure relief valve, the inflation check valve being shown conventionally.

Fig. III is a cross section on a line corresponding to line 3—3 of Fig. II.

In the drawing, similar reference chartacters refer to similar parts throughout the views.

In the drawing, 1 represents the felly of a wheel and 2 the rim thereon, 3 the tire casing and 4 the pneumatic tube. These parts are shown conventionally as they form no part of my invention.

The stem 5 is provided with a head 6 at its inner end and is threaded to receive the clamping nut 7 coacting with the head to secure the stem to the tube. The nut 8 on the inner side of the rim clamps the stem to the rim. The stem is provided with a longitudinal passage 9 having the usual or suitable inflation check valve 10, shown conventionally in Fig. II. The cap 11 is threaded upon the outer end of the stem. Threaded upon the stem on the outer side of the nut 8 is a collar-like valve member 12 having valve seat 13 on its upper side and passages 14 therein communicating with the lateral passage 16 in the valve stem which in turn communicates with the longitudinal passage 9 thereof. A valve member 16 is slidably mounted upon the valve stem above the valve member 12 and has a facing 17 resting upon the valve seat. The valve is held upon its seat by the coiled spring 18 supported by the thrust collar 19 threaded upon the inner side of the cap 11, the collar being adjustable to limit the tension of the spring.

The tubular housing 20 for the spring is carried by the thrust collar 19, the valve 16 being adapted to telescope into the lower end of the housing.

When the pressure within the tire exceeds a predetermined point the valve 16 is raised from its seat allowing or permitting the escape of the excess pressure. The point of relief may be determined by adjusting the collar 19.

In order to permit the removal of the stem from a tire without entirely disassembling the valve mechanism the stem 5 is formed in sections, the sections being connected by a threaded joint 21 which enables the removal of the valve mechanism as a unit from the shank portion of the stem. This is a feature of very great advantage in the practical use of my invention.

I have illustrated and described my improvements in a simple and practical embodiment thereof. I have not attempted to illustrate or describe certain modifications and adaptations which I contemplate as I believe the disclosure made will enable those skilled in the art to which my invention relates to embody or adapt the same as conditions may render desirable.

Having thus described my invention, what I claim as new and desire to secure by Letters Patent, is:

1. A pressure relief valve for pneumatic tires comprising a stem having a longitudinal passage therein provided with a check valve, a cap threaded upon the outer end of said stem, a collar threaded upon said stem and having a valve seat on its outer side, said stem and collar having communicating passages opening into said longitudinal passage of said stem and to said valve seat, a relief valve slidably mounted on said stem above said collar coacting with said valve seat, a pressure spring for said valve, a thrust collar for said spring threaded upon said stem on the inner side of said cap, and a tubular housing for said spring carried by said thrust collar, said relief valve being adapted to telescope into the lower end of said housing.

2. A pressure relief valve for pneumatic tires comprising a stem having a longitudinal passage therein provided with a check valve, a relief valve member on said stem and having a valve seat on its outer side, said stem and member having communicating passages opening into said longitudinal passage of said stem and to said valve seat, a relief valve slidably mounted on said stem above said seat and coacting therewith, a pressure spring for said valve, a thrust collar for said spring threaded upon said stem for adjustment to regulate the tension of the spring, and a tubular housing for said spring carried by said thrust collar, said relief valve being adapted to telescope into the lower end of said housing.

In witness whereof, I have hereunto set my hand and seal in the presence of two witnesses.

CHARLES A. HUSSEY. [L.-S.]

Witnesses:
LUELLA G. GREENFIELD,
MARGARET L. GLASGOW.